United States Patent [19]
Bellezza Quater et al.

[11] Patent Number: 6,116,972
[45] Date of Patent: Sep. 12, 2000

[54] AUXILIARY FLOTATION, PROPULSION AND STEERING GEAR FOR MULTIPURPOSE VEHICLES WITH AMPHIBIAN FUNCTIONS

[75] Inventors: Giorgio Bellezza Quater, Lombardore; Paolo Bellezza Quater; Silvia Bellezza Quater, both of S. Maurizio Canavese, all of Italy

[73] Assignee: A.R.I.S. S.p.A., Lombardore, Italy

[21] Appl. No.: 09/137,514

[22] Filed: Aug. 20, 1998

[51] Int. Cl.[7] ...................................................... B60F 3/00
[52] U.S. Cl. ............................................................ 440/12.51
[58] Field of Search ............................... 440/12.5, 12.51, 440/12.56

[56] References Cited

U.S. PATENT DOCUMENTS

| | | | |
|---|---|---|---|
| 2,068,664 | 1/1937 | Dorst | 440/12.51 |
| 3,229,781 | 1/1966 | Jones . | |
| 3,420,204 | 1/1969 | Samuel | 440/12.51 |
| 3,933,112 | 1/1976 | Veazey . | |
| 4,328,601 | 5/1982 | Rodler, Jr. et al. . | |

FOREIGN PATENT DOCUMENTS

| | | |
|---|---|---|
| 2664230 | 1/1992 | France . |
| 1069235 | 5/1967 | United Kingdom . |

*Primary Examiner*—Jesus D. Sotelo
*Attorney, Agent, or Firm*—Guido Modiano; Albert Josif; Daniel O'Byrne

[57] ABSTRACT

The gear comprises at least two auxiliary flotation sections, respectively a forward section and a stern section, which can be detachably associated with the hull of the vehicle, each section being constituted by a profiled metal container. The forward section has immersed surfaces which are profiled so as to produce lift for hydrodynamic support, and the stern section includes two thrust propellers of the ducted type, arranged symmetrically with respect to the longitudinal centerline plane of the vehicle; auxiliary motor means being provided in order to simultaneously or selectively turn said propellers both for propulsion and for steering.

27 Claims, 3 Drawing Sheets

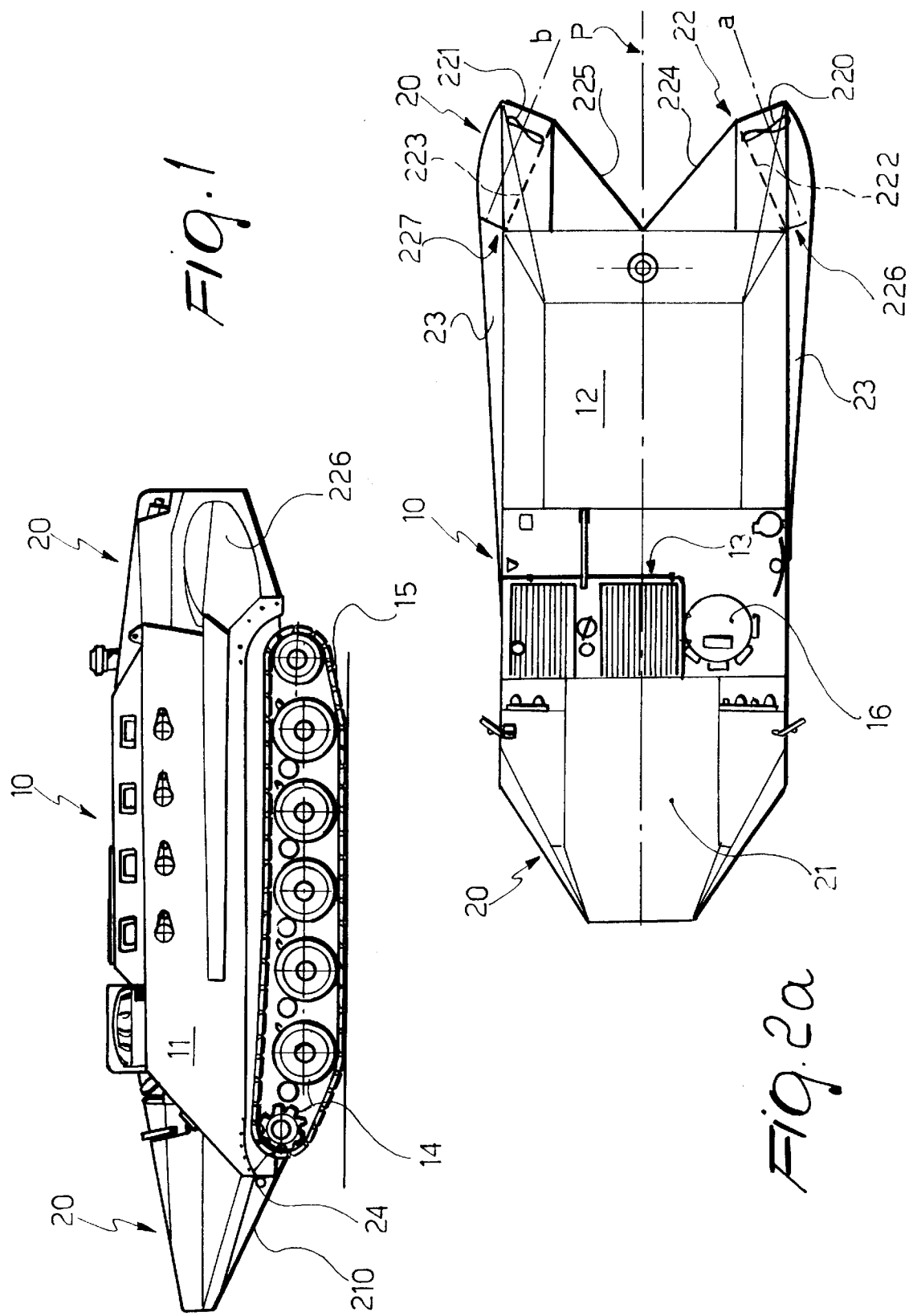

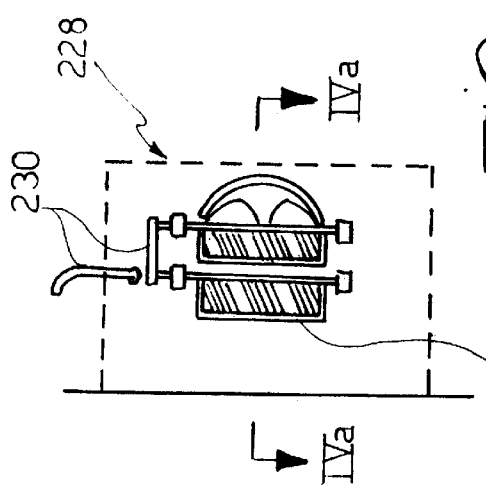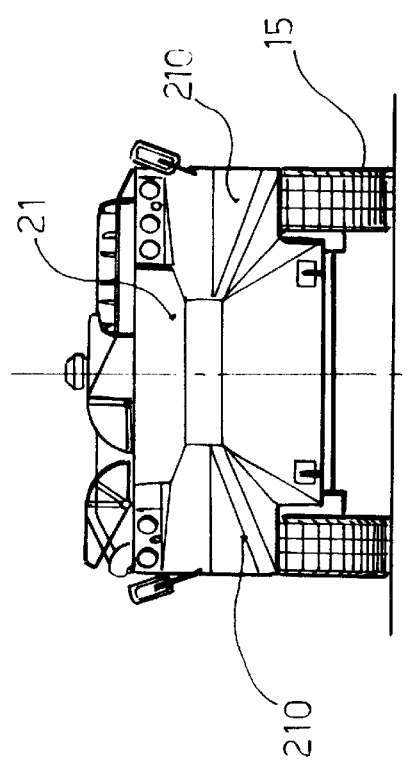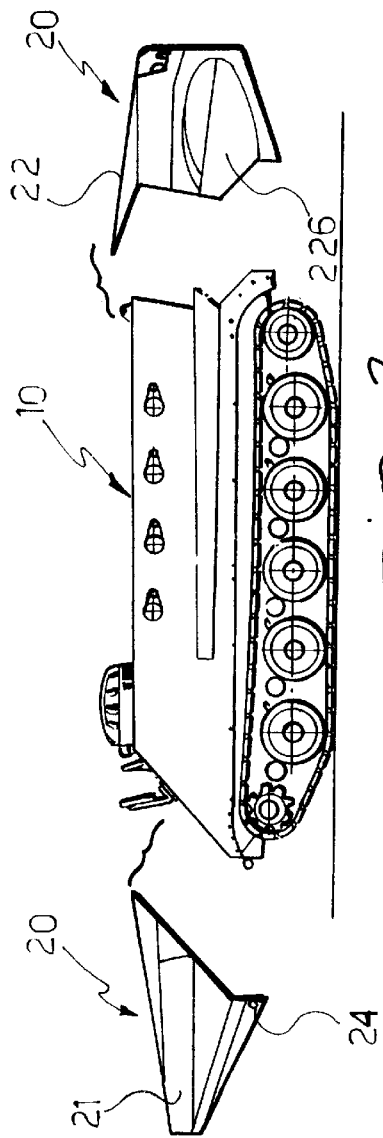

AUXILIARY FLOTATION, PROPULSION AND STEERING GEAR FOR MULTIPURPOSE VEHICLES WITH AMPHIBIAN FUNCTIONS

BACKGROUND OF THE INVENTION

The present invention relates to an auxiliary flotation, propulsion and steering gear for so-called multipurpose vehicles with amphibian functions.

More specifically, the present invention relates to an auxiliary gear which allows generic multipurpose tracked or tired vehicles having limited amphibian capabilities to float, be seaworthy and be steered even in deep and relatively rough water.

Tracked or tired motor vehicles having hermetic characteristics which allow them to ford water courses are already known, but the vehicle must rest on the underlying pebbly shore; it is also known to equip such vehicles with auxiliary means which are suitable to allow them to float, thus converting them into amphibian or multipurpose vehicles.

These vehicles and respective accessory means for their flotation are disclosed in prior Italian patent no. 1,183,793 and in prior Italian Utility Model application no. TO94U000184 in the name of this same Applicant and will be designated as conventional multipurpose vehicles for the sake of brevity.

These conventional multipurpose vehicles generally have limited amphibian capabilities and mainly limited loading capabilities, owing to their great displacement, which determines very high waterlines and a very small freeboard, with the consequent impossibility to navigate in even moderately rough water, equally very low navigation speeds and significant steering difficulties owing to their considerable immersed volume.

SUMMARY OF THE INVENTION

The aim of the present invention is to eliminate these drawbacks, by providing an auxiliary gear capable of significantly improving the amphibian capabilities of said multipurpose vehicles, particularly reducing their immersed volume during navigation by significantly increasing their navigation speed.

Another important object of the present invention is to provide a multipurpose vehicle of the specified type having highly reliable navigation characteristics and at the same time high maneuverability.

Another object of the present invention is to provide an improved auxiliary gear which allows to vary the attitude of the multipurpose vehicle in its operation as a watercraft in order to statically compensate for immersion variations arising from variations in the load being carried, in order to ensure correct operation of the propulsion means in water.

According to the invention, this aim, these important objects and others which will become apparent from the following detailed description are achieved with an auxiliary flotation, propulsion and steering gear for multipurpose vehicles, having the specific characteristics as set forth in the appended claims.

Substantially, the gear according to the present invention is composed of at least two auxiliary flotation sections, respectively a forward section and a stern section, which can be detachably associated with the structure or hull of the vehicle; each section is constituted by a profiled metal container, whose hermetic cavity is advantageously filled with foamed material. The forward section has immersed surfaces which are profiled so as to produce lift for hydrodynamic support; the stern section includes two thrust propellers of the ducted type arranged symmetrically with respect to the longitudinal centerline plane of the vehicle, and is constituted by compartments which can be flooded for immersion control. Auxiliary motor means are provided in order to simultaneously or selectively turn said propellers both for propulsion and for steering.

Moreover, according to the present invention, and in order to avoid trailing vortices and consequent cavitations directly downstream of the transom, the axes of the thrust propellers are arranged so as to mutually converge and intersect at a point which lies on said centerline plane, abaft the stern section, at a distance from said section which is preferably greater than the axial length of the entire vehicle.

The auxiliary motor means are advantageously of the fluid-actuated type and comprise a pair of hydraulic delivery pumps, driven by the onboard engine of the vehicle, and a corresponding pair of reversible hydraulic motors with variable displacement, each whereof drives a corresponding thrust propeller.

BRIEF DESCRIPTION OF THE DRAWINGS

Further characteristics and advantages of the auxiliary gear according to the present invention will become apparent from the following detailed description and with reference to the accompanying drawings, wherein:

FIG. 1 is a schematic elevation view of a tracked multipurpose vehicle, with the floating, propulsion and steering gear according to the present invention associated therewith FIGS. 2a–2b are, respectively, a top plan view and a front view of the multipurpose vehicle of FIG. 1;

FIG. 3 is an exploded plan view, showing in detail the flotation sections of the auxiliary gear according to the present invention;

FIG. 4 is a detail view of the auxiliary stern section, illustrating a thrust and steering propeller;

DESCRIPTION OF THE PREFERRED EMBODIMENTS

Figure 4A:
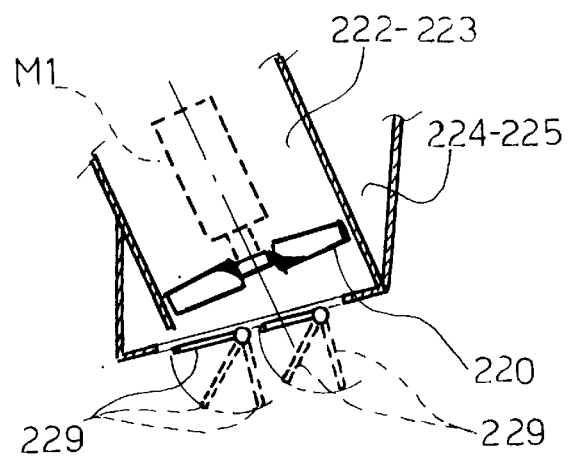
FIG. 4a is a sectional view, taken along the plane IVa—IVa of FIG. 4.

In the drawings, the reference numeral 10 designates a conventional tracked multipurpose vehicle, which comprises a hull-like structure 11 of the watertight type, with a loading platform 12, a powerplant 13 which drives in a known manner the pinions 14 for moving the tracks 15, and a control post, generally designated by the reference numeral 16.

The reference numeral 20 generally designates the auxiliary structure according to the present invention, which is substantially composed of a forward flotation section 21, a stern flotation section 22, and optionally of lateral flotation sections 23 for connecting the stern section to the sides of the hull 11 of the vehicle.

All the auxiliary sections are constituted by hermetic metallic containers, preferably made of aluminum alloy, whose hermetic cavity is filled with foamed polymeric material; said containers are detachably connected to the hull 11 of the vehicle 10.

In particular, the stern section 22 is advantageously bolted to L-shaped elements (not shown) which are provided on the hull 11 of the vehicle, while the forward section is hinged in a downward region at 24 to said hull, to which it can be rigidly coupled in an upward region and laterally by means of locking pins (not shown); said forward section can thus be swung in order to access the compartment of the powerplant 13 of the vehicle.

According to the present invention, the forward section 21 is provided with submerged surfaces 210 which are profiled so as to generate lift for hydrodynamic support when the vehicle is navigating, and the stern section 22 includes two thrust propellers 220,221 of the ducted type which are arranged symmetrically with respect to the longitudinal vertical centerline plane P of the vehicle 10. Each propeller is accommodated in a respective cylindrical seat or duct 222,223 which is associated with a corresponding compartment 224,225 of the stern section, and each duct has a corresponding hydrodynamic intake 226,227 which is directed toward the forward side of the vehicle.

The axes a-b of the thrust propellers 220,221 mutually converge and intersect in a point that lies on said vertical centerline plane of the vehicle, abaft the stern section, preferably at the distance from the (imaginary) transom which is greater than, or equal to, the axial length of the entire vehicle 10.

For this purpose, and advantageously, the axis of each propeller has an angle, with respect to said centerline plane, of 20 to 30 sexagesimal degrees, typically 23°. This arrangement avoids the formation of trailing vortices and the consequent cavitation at the transom, to the advantage of better flotation of the stern section.

On the forward side, each one of the ducts 222,223 is provided with a corresponding vectoring system 228 which is formed by two or more oscillating louvers 229 which are moved synchronously by an actuator 230 which is preferably of the conventional cable type (Bowden). The louvers 229 are suitable to assume three separate positions, shown in dashed lines in the figure: respectively, a retracted position for closing the duct for accident prevention when the vehicle is on land; an axial position for fully opening the duct for normal propulsion while both propellers operate; and a deflected position for the partial opening of the duct, in which the louvers act as hydrodynamic stream deflectors in order to compensate for the transverse component of said stream in emergency operation when a single propeller is active.

Figure 5:
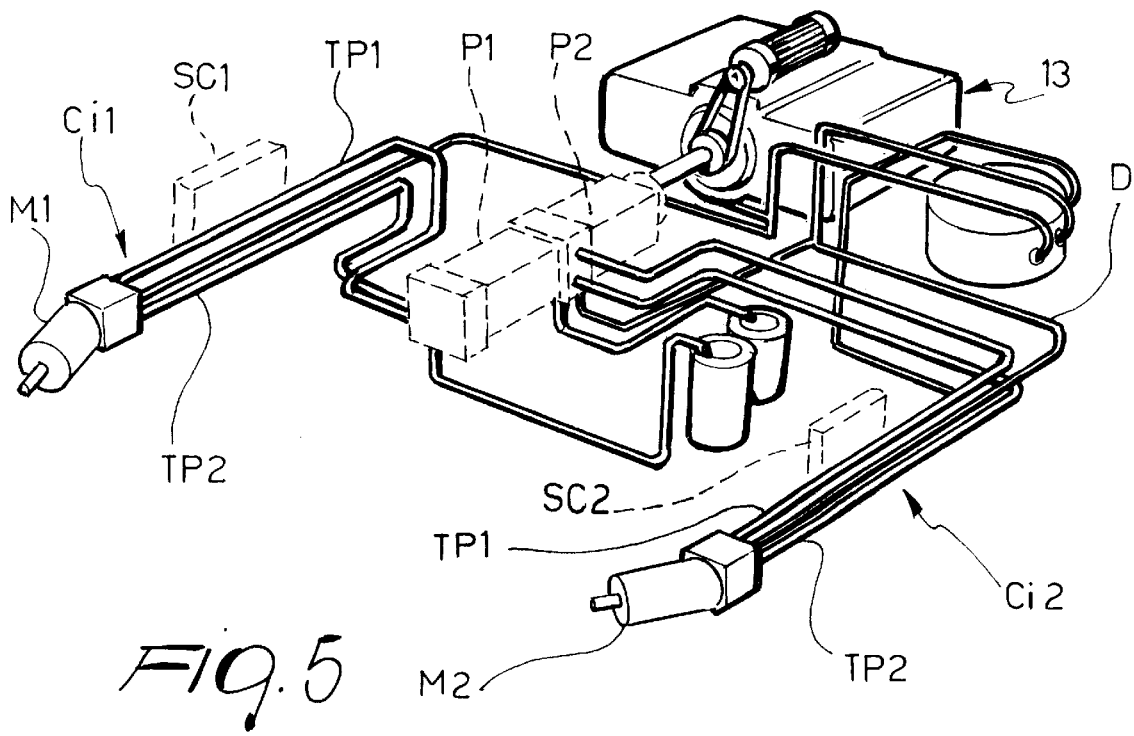
FIG. 5 is a detailed diagram of an advantageous embodiment of the propulsion system.

Each propeller 221,222 is driven by a respective reversible motor, which can be actuated selectively or synchronously with the other motor. For this purpose, two hydraulic auxiliary motors M1–M2, of the variable-displacement type, are advantageously provided (FIG. 5); each motor is associated with a respective propeller 220, 221. The motors M1–M2 are powered by respective hydraulic pumps P1–P2 which are mechanically connected to each other in a tandem arrangement and are actuated, by means of a power take-off, by the powerplant 13 of the vehicle 10. Each pump is connected to the respective motor by means of a corresponding hydraulic circuit Ci1–Ci2, which comprises pressurized delivery and return pipes Tp1–Tp2 and a drainage duct D; the hydraulic circuit is completed by at least one filter and preferably by a centrifugal deaerator. The pipes of said hydraulic circuits run partly outside the hull 11 below the waterline, so that they are cooled by the surrounding water. Immersed heat exchangers SC1–SC2 are advantageously provided on the outer portion of the pipes in order to improve the cooling of the hydraulic fluid.

According to the present invention, furthermore, the compartments 224,225 of the stern section 22 can be flooded in order to vary the attitude of the vehicle in its function as a watercraft; for this purpose, there are provided water inlet valves, not shown in the figure, as well as a drainage pump, also not shown in the figure.

The effects of the present invention of course also apply to models that achieve equal utility by using the same inventive concept.

In particular, the alternative constructive solution, in which the thrust propellers are driven directly by the powerplant 13 by means of a mechanical transmission, achieves the same utility. portions of the pressurized pipes that lie outside the hull comprise respective submerged heat exchangers.

What is claimed is:

1. An auxiliary flotation, propulsion and steering gear for multipurpose vehicles, having an amphibian function, comprising at least two auxiliary flotation sections, respectively a forward section and a stern section, which can be detachably associated with a hull of a vehicle, each section being constituted by a profiled metal container; the forward section having immersed surfaces which are profiled so as to produce lift for hydrodynamic support; the stern section including two thrust propellers of the ducted type arranged symmetrically with respect to a longitudinal centerline plane of the vehicle; auxiliary motor means being provided in order to simultaneously or selectively turn said propellers both for propulsion and for steering; wherein the stern section is provided with compartments which can be flooded in order to control the attitude of the vehicle in its operation as a watercraft.

2. The auxiliary gear according to claim 1, wherein the axes of the thrust propellers are arranged so as to mutually converge and intersect at a point that lies on said centerline plane of the vehicle, abaft the stern section and at a distance from the transom which is greater than, or equal to, the axial extension of the entire vehicle.

3. The auxiliary gear according to claim 2, wherein the axis of each thrust propeller has an angle of 20 to 30 sexagesimal degrees with respect to said centerline plane.

4. The gear according to claim 1, wherein each thrust propeller is accommodated in a respective cylindrical duct associated with a corresponding compartment of the stern section.

5. The gear according to claim 4, wherein each duct is provided with a corresponding dynamic intake which is directed toward the forward side of the vehicle and with a vectoring system which is located on the stern side of said duct.

6. The gear according to claim 5, wherein said vectoring system is formed by two or more oscillating louvers which can assume, by means of an actuator, three separate positions; respectively, a retracted position for closing the duct; an axial position for fully opening the duct; and a deflected position for deflecting the hydrodynamic stream in order to compensate for the transverse component of said stream.

7. The gear according to claim 1, wherein the auxiliary motor means comprise two reversible hydraulic auxiliary motors, each whereof is connected to a respective thrust propeller and is powered by a corresponding hydraulic pump by means of respective hydraulic circuits; the hydraulic pumps being mechanically connected to each other in a tandem configuration and being driven by the powerplant of the vehicle by a power take-off.

8. The gear according to claim 7, wherein said hydraulic circuits comprise pressurized pipes which have a portion that lies outside the hull of the vehicle and is located below the waterline.

9. The gear according to claim 8, wherein said portions of the pressurized pipes that lie outside the hull comprise respective submerged heat exchangers.

10. An auxiliary flotation, propulsion and steering gear for multipurpose vehicles, having an amphibian function, comprising at least two auxiliary flotation sections, respectively a forward section and a stern section, which can be detachably associated with a hull of a vehicle, each section being constituted by a profiled metal container; the forward section having immersed surfaces which are profiled so as to produce lift for hydrodynamic support; the stern section including two thrust propellers of the ducted type arranged symmetrically with respect to a longitudinal centerline plane of the vehicle; auxiliary motor means being provided in order to simultaneously or selectively turn said propellers both for propulsion and for steering; wherein the axes of the thrust propellers are arranged so as to mutually converge and intersect at a point that lies on said centerline plane of the vehicle, abaft the stern section and at a distance from the transom which is greater than, or equal to, the axial extension of the entire vehicle.

11. The auxiliary gear according to claim 10, wherein the stern section is provided with compartments which can be flooded in order to control the attitude of the vehicle in its operation as a watercraft.

12. The auxiliary gear according to claim 10, wherein the axis of each thrust propeller has an angle of 20 to 30 sexagesimal degrees with respect to said centerline plane.

13. The gear according to claim 10, wherein each thrust propeller is accommodated in a respective cylindrical duct associated with a corresponding compartment of the stern section.

14. The gear according to claim 13, wherein each duct is provided with a corresponding dynamic intake which is directed toward the forward side of the vehicle and with a vectoring system which is located on the stern side of said duct.

15. The gear according to claim 14, wherein said vectoring system is formed by two or more oscillating louvers which can assume, by means of an actuator, three separate positions; respectively, a retracted position for closing the duct; an axial position for fully opening the duct; and a deflected position for deflecting the hydrodynamic stream in order to compensate for the transverse component of said stream.

16. The gear according to claim 10, wherein the auxiliary motor means comprise two reversible hydraulic auxiliary motors, each whereof is connected to a respective thrust propeller and is powered by a corresponding hydraulic pump by means of respective hydraulic circuits; the hydraulic pumps being mechanically connected to each other in a tandem configuration and being driven by the powerplant of the vehicle by a power take-off.

17. The gear according to claim 16, wherein said hydraulic circuits comprise pressurized pipes which have a portion that lies outside the hull of the vehicle and is located below the waterline.

18. The gear according to claim 17, wherein said portions of the pressurized pipes that lie outside the hull comprise respective submerged heat exchangers.

19. An auxiliary flotation, propulsion and steering gear for multipurpose vehicles, having an amphibian function, comprising at least two auxiliary flotation sections, respectively a forward section and a stern section, which can be detachably associated with a hull of a vehicle, each section being constituted by a profiled metal container; the forward section having immersed surfaces which are profiled so as to produce lift for hydrodynamic support; the stern section including two thrust propellers of the ducted type arranged symmetrically with respect to a longitudinal centerline plane of the vehicle; auxiliary motor means being provided in order to simultaneously or selectively turn said propellers both for propulsion and for steering; wherein the auxiliary motor means comprise two reversible hydraulic auxiliary motors, each whereof is connected to a respective thrust propeller and is powered by a corresponding hydraulic pump by means of respective hydraulic circuits; the hydraulic pumps being mechanically connected to each other in a tandem configuration and being driven by the powerplant of the vehicle by a power take-off.

20. The gear according to claim 19, wherein said hydraulic circuits comprise pressurized pipes which have a portion that lies outside the hull of the vehicle and is located below the waterline.

21. The gear according to claim 20, wherein said portions of the pressurized pipes that lie outside the hull comprise respective submerged heat exchangers.

22. The gear according to claim 19, wherein the stern section is provided with compartments which can be flooded in order to control the attitude of the vehicle in its operation as a watercraft.

23. The gear according to claim 19, wherein the axes of the thrust propellers are arranged so as to mutually converge and intersect at a point that lies on said centerline plane of the vehicle, abaft the stern section and at a distance from the transom which is greater than, or equal to, the axial extension of the entire vehicle.

24. The gear according to claim 23, wherein the axis of each thrust propeller has an angle of 20 to 30 sexagesimal degrees with respect to said centerline plane.

25. The gear according to claim 19, wherein each thrust propeller is accommodated in a respective cylindrical duct associated with a corresponding compartment of the stern section.

26. The gear according to claim 25, wherein each duct is provided with a corresponding dynamic intake which is directed toward the forward side of the vehicle and with a vectoring system which is located on the stern side of said duct.

27. The gear according to claim 26, wherein said vectoring system is formed by two or more oscillating louvers which can assume, by means of an actuator, three separate positions; respectively, a retracted position for closing the duct; an axial position for fully opening the duct; and a deflected position for deflecting the hydrodynamic stream in order to compensate for the transverse component of said stream.

* * * * *